Dec. 20, 1932.   C. E. SCHLENKER   1,891,453
INTERNAL COMBUSTION ENGINE
Filed May 31, 1929   5 Sheets-Sheet 3

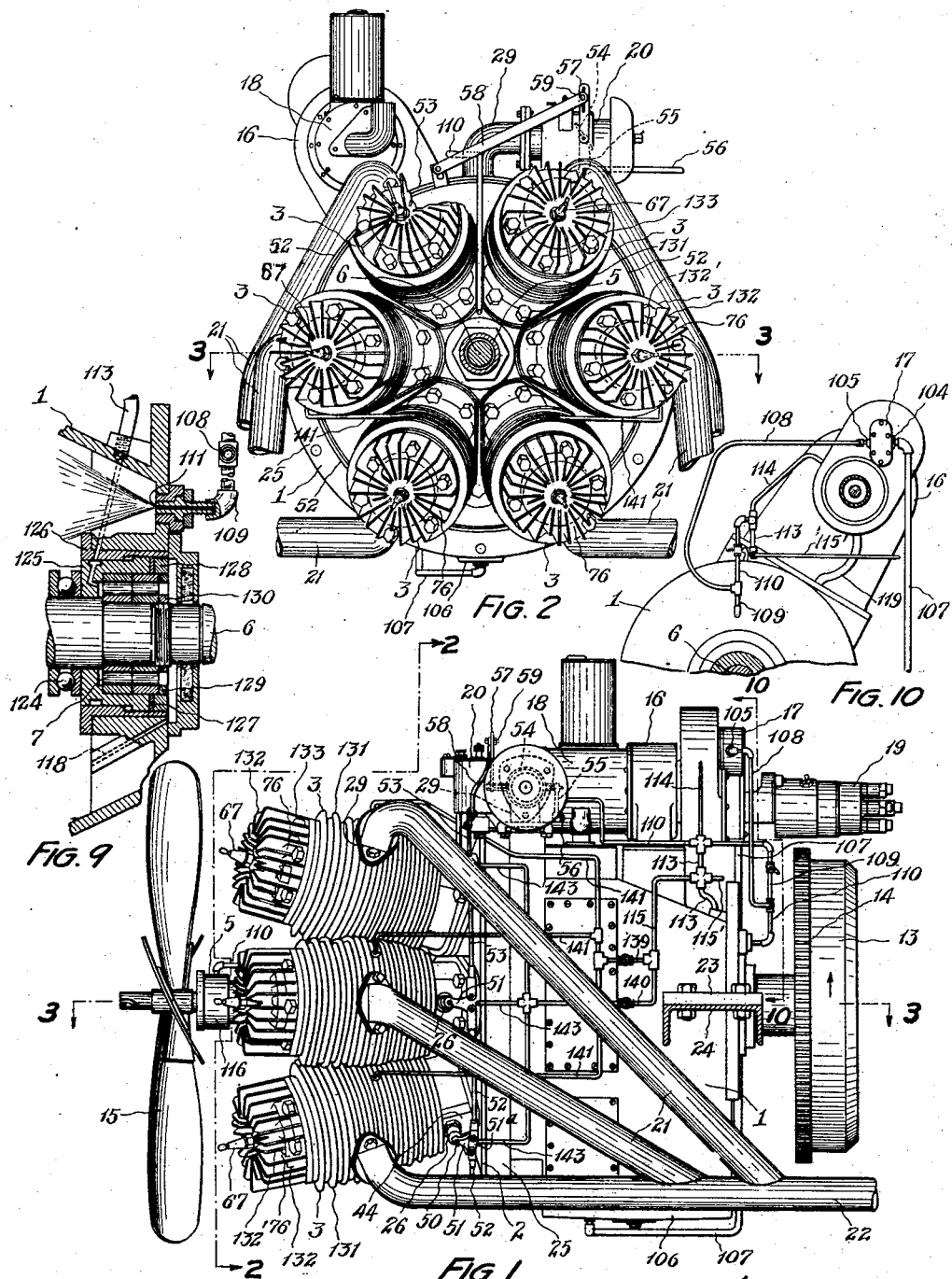

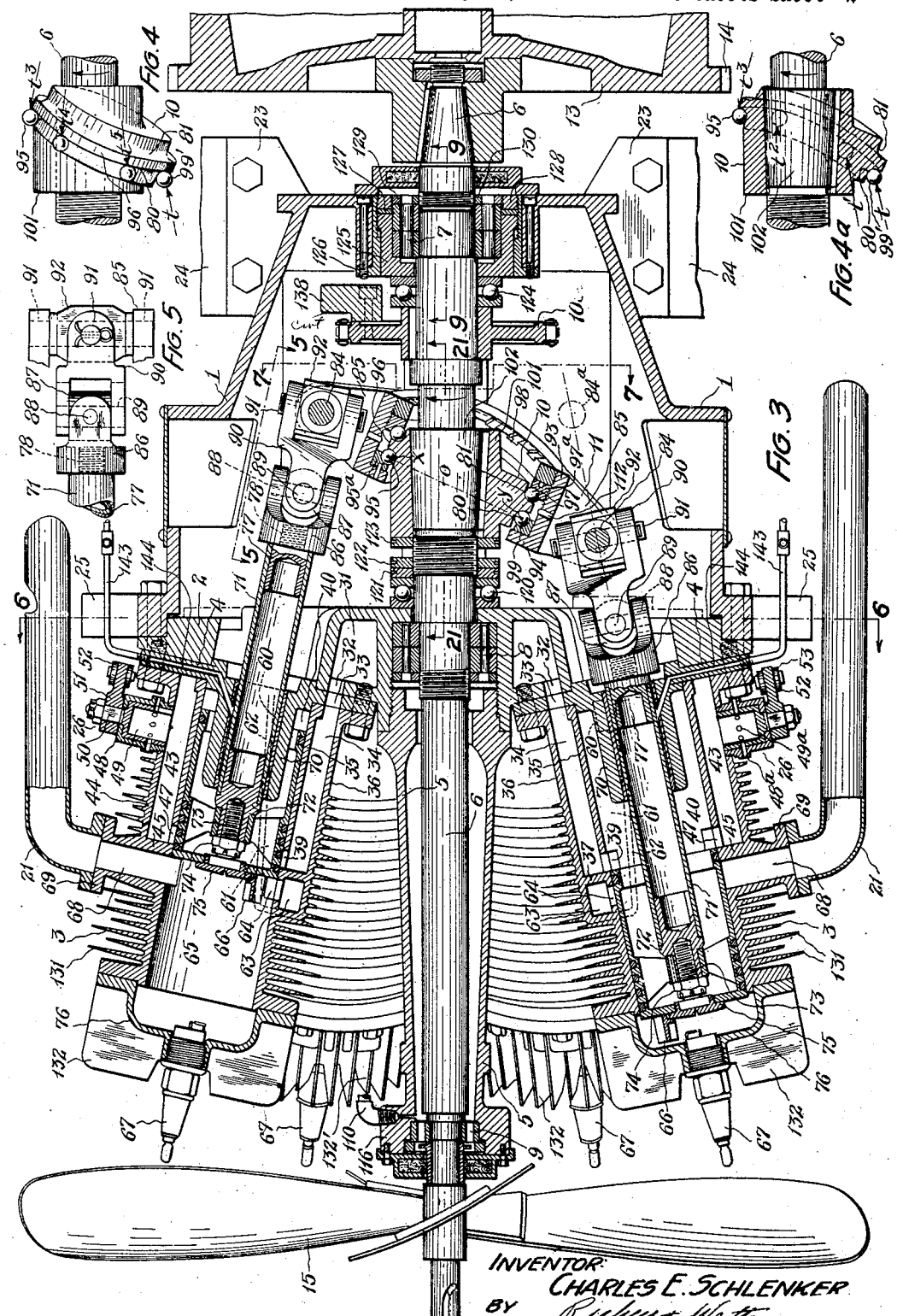

INVENTOR:
CHARLES E. SCHLENKER
BY Richey & Watts
ATTORNEYS

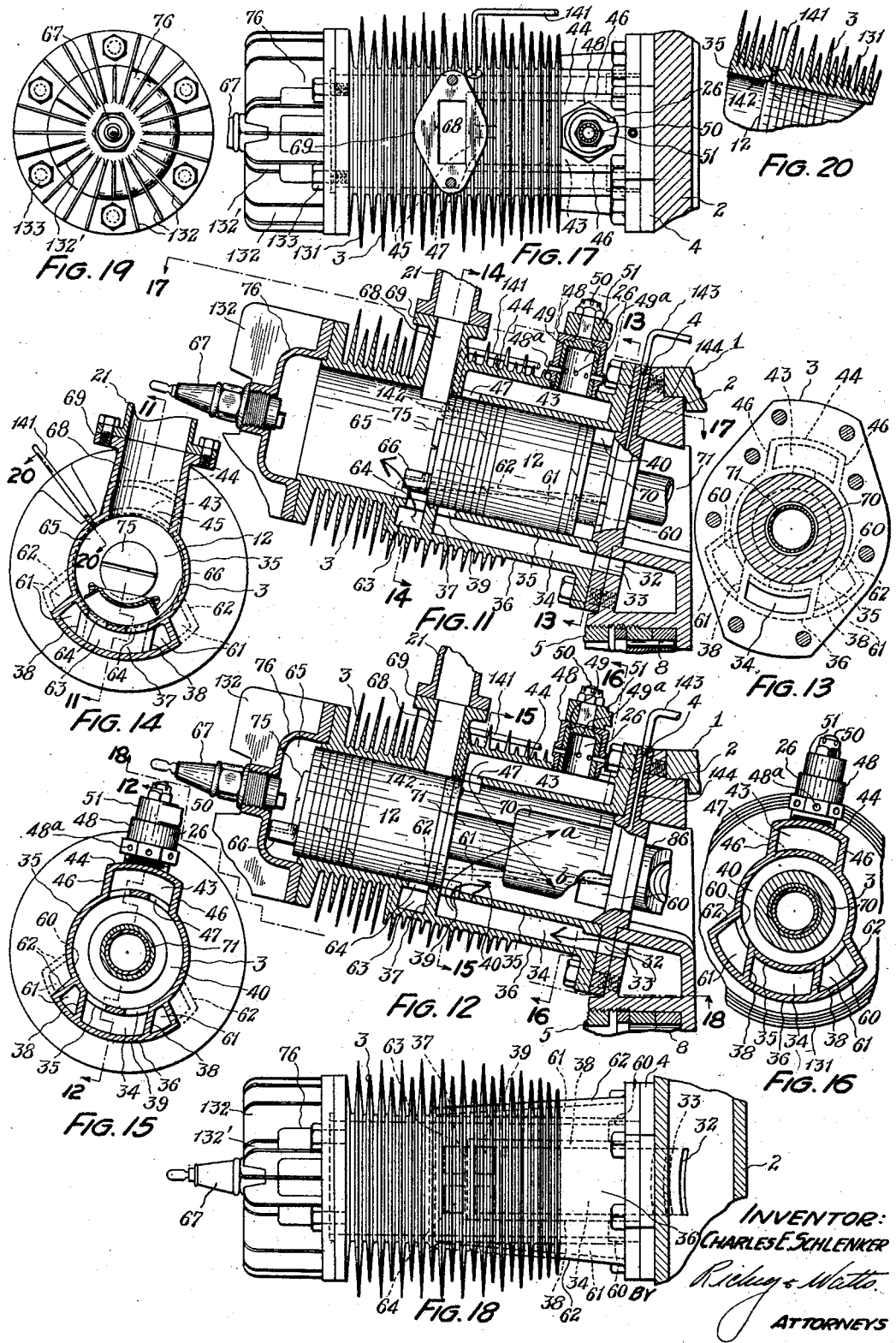

Dec. 20, 1932.   C. E. SCHLENKER   1,891,453
INTERNAL COMBUSTION ENGINE
Filed May 31, 1929   5 Sheets-Sheet 5
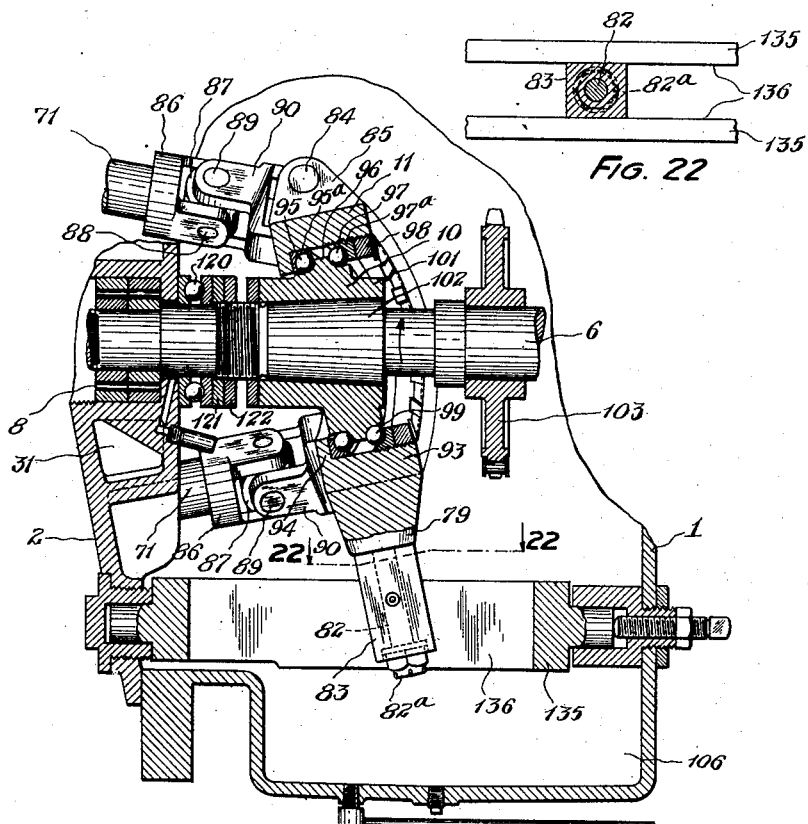
FIG. 22
FIG. 21
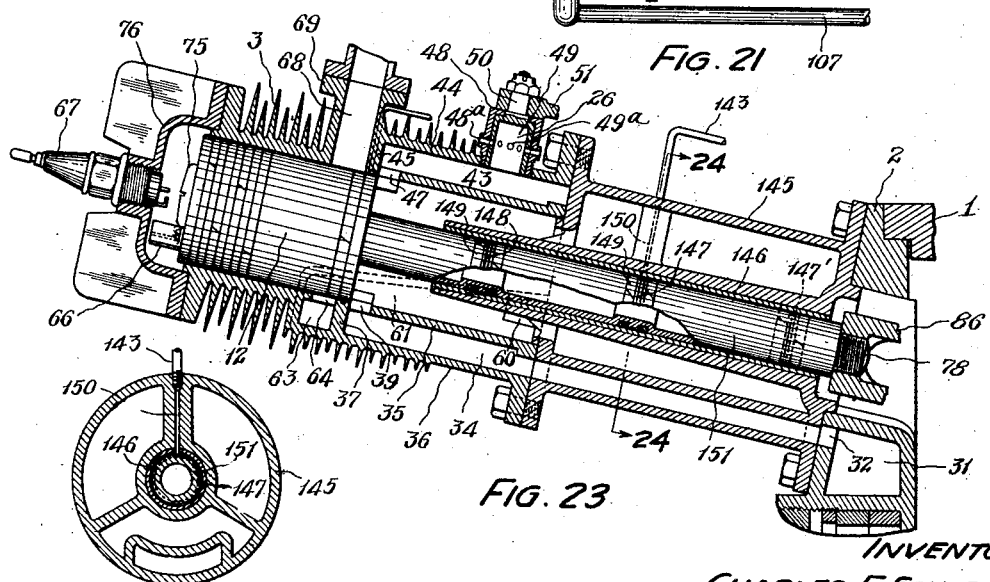
FIG. 23
FIG. 24
INVENTOR:
CHARLES E. SCHLENKER
BY
ATTORNEYS Patented Dec. 20, 1932

1,891,453

UNITED STATES PATENT OFFICE

CHARLES E. SCHLENKER, OF LAKEWOOD, OHIO, ASSIGNOR TO WESTERN RESERVE AIR MOTORS CORPORATION, A CORPORATION OF OHIO

INTERNAL COMBUSTION ENGINE

Application filed May 31, 1929. Serial No. 367,223.

My invention relates to internal combustion engines and particularly to that type of engine known as two stroke cycle internal combustion engine. More specifically, this invention relates to improvements in the principles of operation and to the arrangement of the component parts of this type of engine.

One object of this invention is to produce an internal combustion engine which will be efficient and quiet in its operation and economical in its construction.

Another object of this invention is to provide an improved mechanism for actuating the driven shaft of an engine.

A further object is to provide a drive for an engine in which each piston acts with greatest leverage on the shaft driving mechanism simultaneously with the greatest pressure on the piston.

A further object is to provide an improved driving connection between the piston and the shaft in which all parts thereof move in substantially a straight line.

A further object is to provide an improved arrangement of cylinders for an internal combustion engine.

A further object is to provide an engine wherein the cooling fan disposed in closer relation to the cylinder heads than to the other portions of the cylinders.

A further object is to arrange the cylinders in such a manner that they may be more effectively cooled.

A further object is to provide improved means for scavenging the products of combustion from the cylinders.

A further object is to prevent the escape of combustible gases through the exhaust opening of the cylinders.

A further object is to so arrange the scavenging action that the scavenging air will precede the entry of the combustible mixture into the explosion chamber.

A further object is to provide an oil mist in the main case of an internal combustion engine.

A further object is to construct an internal combustion engine of the two stroke cycle type in which no gasoline or other lubricating oil solvent is introduced into the main driving case of the engine.

A further object is to produce a novel and efficient type of manifold for combustible mixtures for internal combustion engines.

A further object is to provide an engine of this type in which all parts are rigidly connected, compactly arranged and so mounted as to be easily accessible for inspection and repairs.

These objects and still other objects and the invention itself will become more apparent from the following description of an embodiment thereof in which description reference will be had to the accompanying drawings forming a part of this specification.

The drawings and the following description set forth in detail certain means embodying this invention, said disclosed means, however, constituting but one of the forms in which the principles of my invention may be applied.

In the drawings:

Figure 1 is a side elevational view of my improved engine;

Figure 2 is a view taken from the plane indicated by the line 2—2, Figure 1, this view being largely a front elevation of my engine with certain parts broken away.

Figure 3 is an enlarged view taken from the plane indicated by lines 3—3, of Figures 1 and 2;

Figure 4 is a fragmentary plan view of the main driven element carried by the driven shaft, certain parts thereon being omitted to better illustrate the principle of operation;

Figure 4a is a fragmentary plan sectional view of the element shown in Figure 4.

Figure 5 is a fragmentary plan view of the connection between a piston rod and the drive ring, taken from the plane indicated by the line 5—5, Figure 3;

Figure 9 is a fragmentary vertical axial section illustrating the device for feeding the oil mist into the eccentric case, this view being taken from the plane indicated by the line 9—9, Figure 3;

Figure 10 is a fragmentary vertical end elevation of this engine taken from the plane indicated by the line 10—10, Figure 1;

Figure 11 is a view of a cylinder and piston similar to a portion of Figure 3, the piston being shown in elevation and at the extreme inner end of its stroke.

Figure 12 is a view similar to Figure 11, but with the piston shown in the extreme outer end of its stroke.

Figure 13 is a cross-sectional view at the base of the cylinder taken from the plane indicated by the line 13—13, Figure 11;

Figure 14 is a cross-sectional view through the cylinder taken from the plane indicated by line 14—14, Figure 11;

Figure 15 is another cross-sectional view through the cylinder taken from the plane indicated by the line 15—15, Figure 12;

Figure 16 is another cross-sectional view through the cylinder taken from the plane indicated by the line 16—16, Figure 12;

Figure 17 is a side view of the cylinder, this figure showing the cylinder as viewed when looking toward the cylinder from the plane indicated by line 17—17, Figure 11;

Figure 18 is another side view of the cylinder, certain ports and passages being shown in dotted lines, this figure showing the cylinder taken from the plane indicated by line 18—18, Figure 12;

Figure 19 is a plan view of the head of a cylinder.

Figure 20 is a fragmentary longitudinal section showing the means for lubricating the cylinder walls, this view being taken from the plane indicated by line 20—20, Figure 14;

Figure 21 is a fragmentary vertical longitudinal section through a portion of the engine showing particularly a device for preventing rotation of the drive ring used for transmitting motion from the pistons to the driven shaft, his view being taken from the plane indicated by the line 21—21, Figure 3;

Figure 22 is a fragmentary plan section taken from the plane indicated by line 22—22, Figure 21;

Figure 23 is an axial section similar to Figure 12 but showing a modified type of piston rod and bearing therefor and also showing an improved means for lubricating said piston rod; and Figure 24 is a cross-sectional view taken from the plane indicated by line 24—24, Figure 23.

Referring to the drawings in which the same parts are indicated by the same respective ordinals in the several views, I shall first describe the general features of my improved internal combustion engine.

General features

Figure 6:
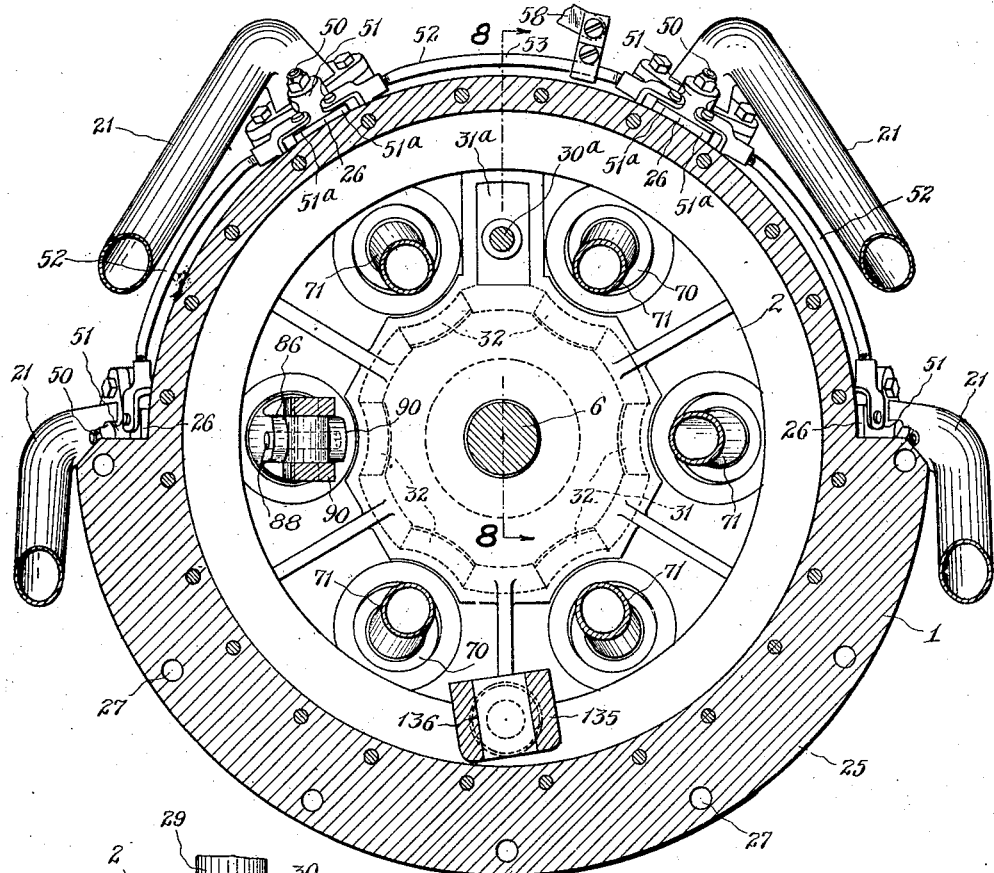
Figure 6 is a cross-section through the engine taken from the plane indicated by line 6—6, Figure 3.

Referring particularly to Figures 1, 2 and 3, 1 indicates the main casing of this improved engine, 2 indicates a cylinder plate upon which are mounted a series of cylinders 3 separated, however, from the cylinder plate by means of spacer castings 4. Likewise mounted on the cylinder plate is a tapered tubular member 5, Figure 3. The driven shaft 6 is mounted in bearings 7, 8 and 9 in main casing 1, cylinder plate 2, and tapered tubular member 5, respectively. Rigidly mounted on the shaft 6 is an angularly disposed eccentric or driven member 10 adapted to be actuated by a drive ring 11 which in turn, through a series of connections, is actuated by a series of pistons 12. Mounted on one end of the shaft, the right end, as shown in Figures 1 and 3, is the usual flywheel 13 provided with gear teeth 14 adapted to be engaged by a starting device, not shown, since it forms no part of this invention. Mounted upon the opposite end of the shaft is a cooling fan 15. The fan end of the engine will be hereinafter referred to as the front of the engine while the flywheel end will be referred to as the rear of the engine. Mounted upon one side of the main casing is a bracket 16 which serves as a support for an oil pump 17 of any desired type, this bracket also supports a generator 18 and the usual distributor 19. A carburetor 20 of any accepted type is likewise mounted upon this casing, as clearly shown in Figures 1 and 2. These figures also show a series of exhaust tubes 21 discharging into exhaust pipes 22.

Support for engine

It will be understood that any type of support may be provided for this improved engine and the type of support selected will depend upon the service for which the engine is intended. The particular form of engine shown in the drawings is intended to be used for an automotive vehicle and the main casing 1 is accordingly provided with ears 23 at one end, the right or rear end, as shown in Figures 1 and 3. These ears are adapted to be connected to a supporting channel member 24 which forms a part of the automobile chassis, as will be readily understood.

The opposite end of the main casing 1, the left or front end, as shown in Figures 1 and 3, is provided with a semicircular flange 25 extending around the bottom of the casing as is clearly shown in Figures 3 and 6. This flange may be connected to a saddle bracket or any other suitable frame, not shown, by means of a series of bolts disposed in the holes 27 so that the front end of this engine

Combustible mixture supply

Figures 7, 8:
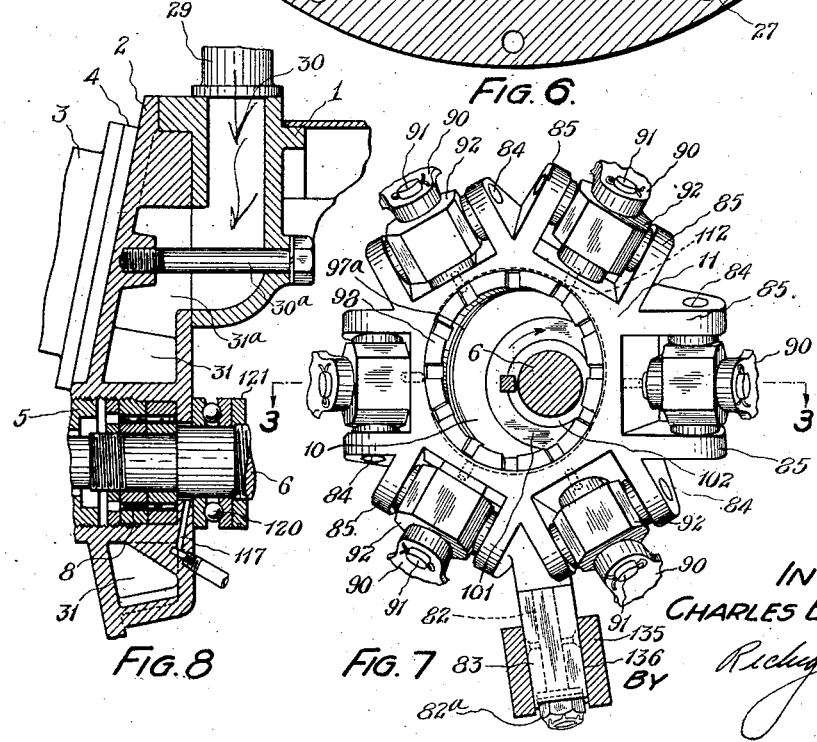
Figure 7 is an elevation of the driving elements on the driven shaft, this view being taken from the plane indicated by the line 7—7, Figure 3.
Figure 8 is a fragmentary vertical axial section illustrating the intake of the engine and taken from the plane indicated by line 8—8, Figure 6.

Referring to Figures 1, 2 and 8, the carburetor 20 is shown to be mounted at one inlet of an elbow 29, the opposite inlet of which is suitably mounted on and connected to the top of the main casing 1, as shown in Figures 2 and 8. A duct 30 is provided in the main casing 1 at this point, the upper end of said duct being in communication with the lower end of the elbow 29 and the lower end of the duct 30 communicating with a passage 31a leading to a chamber 31 formed in the cylinder plate 2. A bolt 30a, Figures 6 and 8, is provided so as to insure a tight contact between the main casing 1 and the cylinder plate where the duct 30 registers with the passage 31a. The chamber 31 is annular in shape and, in fact, serves as a combustible mixture inlet manifold.

Spaced at suitable intervals in the front wall of the cylinder plate are a series of openings 32, Figures 3, 11 and 12, serving as ports for the discharge of the combustible mixture from the manifold. Registering with these openings 32 are corresponding openings 33 formed in the spacer castings 4, as clearly shown in Figures 3, 11, 12 and 18. As likewise shown in the above Figures and in Figures 13 and 15, the opening 33 communicates with a duct 34 formed in each of the cylinders between the main cylinder wall 35 and a wall 36 suitably spaced therefrom. The duct 34 is confined laterally by the side walls 38 and the upper end of this duct is terminated by a transverse wall 37. Immediately below the transverse wall 27, the main cylinder wall 35 is provided with a port 39 which serves as a combustible mixture inlet port to the primary compression chamber 40. This port 39 as well as other ports in the cylinder wall hereinafter to be referred to, in fact, consist of two adjacent openings, separated by a bridge, as is common practice but will be referred to in the singular for sake of simplicity. The combustible mixture inlet port 39 is normally closed by the piston 12. The stroke of the piston however, is such that the port 39 is completely opened when the piston reaches the extreme end of its stroke to the left, thus providing communication betwen the primary compression space 40 and the combustible mixture manifold 31 when the piston is in the extreme left end position.

It will be apparent that the above-described manifold 31 is compactly formed in the body of the internal combustion engine and that it provides a short and direct passage for the combustible mixture from the carburetor to the cylinder. This mixture in the manifold 31 may likewise serve as a cooling medium for the bearing 8 which is surrounded by the manifold. The mixture tends to absorb heat by contact with the walls of the manifold 31 and is thus preheated. It will further be evident that the combustible mixture does not come in contact with any moving surfaces or lubricated parts until it reaches the interior of the cylinder and that it does not, therefore, tend to dissolve any of the lubricating oil from moving parts.

Air supply

Referring to Figures 3, 11, 12, 15, 16 and 17, it will be noted that the outer cylinder wall 44 is provided with an opening in which is securely mounted the casing 48 of an air valve 26. Interiorly of this casing a cylindrical valve member 49 is mounted for rotation. This valve member is provided with a series of perforations 49a adapted to register with corresponding perforations 48a in the scavenging valve casing 48. The valve member 49 is further provided with a stem 50 upon which a lever 51 is fixedly mounted. The openings 48a are open to the atmosphere. It will be apparent that by rotating the valve member 49 that to a greater or less degree a larger or smaller area of openings can be caused to register and thus a greater or less amount of air will pass through these registering openings 48a and 49a depending upon the suction in the interior of this scavenging air valve 26.

Ducts 43 are formed in the cylinder between the outer cylinder wall 44 and the main cylinder wall 35, as will be evident from Figures 12 and 16. The upper end of this duct 43 is closed by a transverse wall 45. The sides of the duct 43 are formed by the side walls 46, as clearly shown in Figures 16 and 17. The cylinder wall is formed with a port 47 registering with the upper end of the duct 43 immediately below the transverse wall 45, this port forming the air inlet port. This port 47 is located substantially the same distance from the ends of the cylinder as the port 39, and is likewise normally closed by the piston but is completely opened when the piston reaches the extreme upper end of its stroke, thus providing communication between the atmosphere and the primary compression chamber 40 through the duct 43 and the scavenging air valve 26, this communicating being separate and distinct from the passage for combustible mixture.

Air inlet control

Referring to Figures 1, 2, 3 and 6, it will be noted that a scavenging air inlet valve is provided for each cylinder and that the lever 51 of each valve is provided with ears 51a. These ears on adjacent levers 51 are connected by arcuate rods 52. These arcuate rods 52 together with ears 51a, as will appear from Figures 1, 2 and 6, form a continuous closed ring 53 entirely surrounding the engine and operatively connecting all of the levers 51. It will thus be seen that all scavenging air valves are connected together and may be simultaneously actuated to permit the introduction of a like increase or decrease of scavenging air into all of the cylinders at the same time.

Referring now to Figures 1 and 2, it will be noted that the carburetor 20 is provided with a butterfly valve 54 suitably controlled by a lever 55. This lever 55 is connected by a link 56 to the dash in any desired manner for purposes of controlling the supply of combustible mixture to the engine. The lever 55 is likewise formed with a slotted extension 57 in which one end of a link 58 is adjustably and pivotally mounted by means of the bolt or pin 59. This link 58 is in turn pivotally connected by means of pins or otherwise to one of the arcuate rods 52 of the ring 53, as clearly shown in Figure 6. It will be apparent from the above that any movement of the lever 55 and the butterfly valve 54 will cause a simultaneous and corresponding movement of the extension 57 and an angular movement of the ring 53. The proportion of the angular movement of the ring 53 with relation to the angular movement of the butterfly valve 54 can be regulated by adjusting the position of the bolt or pin 59 in the lever 57. From the above description it will be clear that the opening of the butterfly valve 54 will cause a simultaneous and proportionate increase in the area of registration of the openings 48a and 49a in the scavenging air valves 26 resulting in an increase in the supply of scavenging air concomitantly with the increase in the quantity of combustible mixture supplied to the engine.

Gas supply to explosion chamber

Referring to Figures 3 and 11 to 17 inclusive, the cylinder wall 35 is intersected near its lower end by two openings 60, 60. These openings 60 are preferably symmetrically arranged about a longitudinal center line passing through the combustible mixture inlet port, as shown in Figures 16 and 18, these openings 60 each communicating with duct 61. These ducts 61 are adjacent to and on each side of the duct 34. The ducts 61 are each formed by the cylinder wall 35, a continuation of the outer wall 36, the side walls 38 and outer side walls 62, as clearly shown in Figure 16. These ducts extend substantially longitudinally along the outer wall of the cylinder to a point above the transverse wall 37. At this point the two ducts unite and form the space 63. Immediately above the transverse wall 37 the cylinder wall 35 is perforated by a port 64. This port serves as the inlet for the gases and mixture from the primary compression chamber 40 to the explosion chamber 65. It will be understood that the port 64 is normally closed by the piston but is completely opened when the piston reaches the extreme lower position of its stroke. Reference to Figures 11, 12 and 14 will disclose a deflector plate 66 mounted on top of the piston. A spark plug 67 of the usual type is inserted in the explosion chamber and receives its electrical impulses in the usual manner under the control of the distributor 19.

Exhaust

Referring to Figures 11, 12, 14 and 17, the wall 35 of the cylinder is intersected by a port 68 which extends radially outward from the piston and is provided at its outer end with a flange 69. This port provides an opening for the exhaust of the consumed gases from the explosion chamber after the explosion stroke. It will be noted that this exhaust opening is of slightly greater dimension in a direction longitudinally of the cylinder than the inlet opening 64 and that the uppermost point of this exhaust port 68 is located closer to the cylinder head than the uppermost point of the inlet port 64. Secured to the flange 69 is the exhaust tube 21. One exhaust tube 21 is provided for each cylinder. These tubes 21 discharge into common exhaust pipes 22, two pipes 22 being shown, one for each side of the engine and each serving to conduct the exhaust from three cylinders, as shown in Figure 1.

Operation of pistons and cylinders

All pistons and cylinders are similarly constructed and operate alike. Figure 11 illustrates a longitudinal section through the cylinder with the piston in the extreme right hand or inner position and Figure 12 illustrates the same parts but with the piston in the extreme left hand or outer position. It is believed that, as the piston passes from the inner position shown in Figure 11, to the outer position shown in Figure 12, a partial vacuum or suction is created in the primary compression chamber 40 and this will start at the instant when the top of the piston 12 closes the port 64 so that no gas can enter the compression chamber 40 via the port 64, the space 63, the ducts 61 and ports 60. This suction is, of course, broken as soon as the ports 39 and 47 are uncovered by the lower end of the piston, at which time the suction in the primary compression chamber 40 then causes combustible mixture to pass into this primary combustion chamber via the port 39 and the duct 34 from the combustible mixture inlet manifold 31. This so called suction likewise causes scavenging air to enter the chamber 40 via the port 47 and duct 43 from the atmosphere.

The inward travel of the piston from the position indicated in Figure 12 to the position indicated in Figure 11 will cause the gases in the primary combustion chamber 40 to be compressed. The compression will start at the instant of the closing of the ports 39 and 47 by the lowermost part of the skirt of the piston 12 and will continue until the port 64 is opened by the top of the piston. It should be observed at this point, however, that due to the closer proximity of the upper edge of the exhaust port 68 to the upper end of the cylinder, the port 68 will open slightly before the piston 12 opens the port 64. This allows the consumed gases, resulting from the explosion, to escape before the next charge of gases is admitted to the explosion chamber.

As soon as the port 64 is opened by the top of the piston the gases, which had been previously compressed in the primary compression chamber 40, escape from this compression chamber via the ports 60, ducts 61, space 63 and port 64 into the explosion chamber. The deflector plate 66 serves the purpose of directing the entering gases into the upper portion of the cylinder head and prevents a short circuit of the gases directly to the exhaust port 68 from the inlet port 64.

Due to the fact that the ports 60 are located on the opposite side of the cylinder from the scavenging air inlet ports 47 and due to the fact that the scavenging air rushes to that side of the cylinder opposite to the scavenging air inlet port 47, the scavenging air will be the first to be discharged from the primary compression chamber 40 into the ducts 61 and through the port 64. This scavenging air will then rush into the explosion chamber and a substantial proportion of it will escape outward through the exhaust port 68 driving all of the consumed gases before it. The various ports can be so selected and the various controls can be so adjusted that practically all of this scavenging air will have escaped through the exhaust port before any of the combustible mixture escapes and the combustible mixture will then completely fill the well scavenged explosion chamber.

At this point the piston is forced outward from the position shown in Figure 11 to the position shown in Figure 12 by the action of the eccentric member on the main driven shaft, as will be hereinafter explained. This upward stroke causes a relatively high compression of the gases previously forced into the explosion chamber and likewise causes a repetition of the suction in the primary compression chamber as previously explained. At the proper instant the spark from the spark plug 67 will cause the combustion of the compressed mixture thus permitting the gases to expand forcing the piston downward until the exhaust point is reached as previously described.

It will be apparent from the above that I have provided separate inlets to the cylinder for combustible mixture and scavenging air, and that the scavenging air is taken from the atmosphere and is therefore free from burnt gases and is rich in oxygen. It will also be evident that I have so located the inlet and discharge ports in the cylinder so as to maintain a substantial separation of the scavenging air and combustible mixture and that these gases are transferred into the explosion in consecutive order.

One of the usual disadvantages of a two stroke cycle engine is the well known fact that a large percentage of the incoming gas is lost through the exhaust port when a thorough scavenging of the explosion chamber is attempted. I have eliminated this disadvantage in this improved engine, however, due to the fact that I am providing a separate scavenging air and that I am providing a separate inlet for this air into the primary combustion chamber and I am so locating the openings and ducts that the scavenging gas enters the cylinder in advance of the combustible mixture.

*Piston rods and connections*

Referring particularly to Figures 3 and 12, it will be noted that the spacer casting 4 is provided with a central hub 70 which is provided with a bushing and serves as a guide for the piston rod 71. This bearing is of substantial length and practically eliminates the transfer of any side thrust on the piston which in turn prevents wear of piston or cylinder. The piston rod 71 is preferably made hollow for the sake of strength and lightness, and has integrally connected to it at its upper end a plug 72 in which is secured a stud 73.

The piston 12 is securely fastened to the plug 72 by means of a lock nut 74, as clearly shown. The top of the piston has an opening closed by a screwed cap 75 which is in turn locked by the deflector plate 66. The upper end of the cylinder is closed by the cylinder head 76. In order to remove the piston it is only necessary to remove the cylinder head 76, whereupon the deflector 66 and the screwed cap 75 can easily be removed. It is then only necessary to unscrew the nut 74 which will immediately release the piston 12 for removal. It will therefore be seen that I have provided a removable piston which is rigidly mounted in the cylinder and which is readily accessible for inspection and repairs.

Referring to Figures 3, 5, 7 and 21 a plug 77 is rigidly secured to the lower end of a piston rod and is formed with a threaded stud projection 78. A clevis 86 is securely mounted on this threaded stud projection. Mounted between the ears of this clevis is a block 87 pivotally mounted on trunnions 88 mounted in the block. A pin 89 at right angles to the trunnions 88 in the block 87 is pivotally connected with the ears at one end of a double clevis 90, shown in Figures 3, 5, 7 and 21. The ears at the other end of this double clevis 90 are pivotally connected to the trunnions 91 of a block 92, this block 92 in turn being pivotally mounted upon a pin 84 whose axis is at right angles with the axes of the trunnions 91. This pin 84 is mounted in the ears 85 of the drive ring 11.

Referring to Figures 3, 4, 4a, 7 and 21, the drive ring 11 is shown to be formed with a pair of ears 85 for each piston. This drive ring is provided with an annular hub portion 93 formed with a shoulder 94. Seated within this hub and against the shoulder 94 is an outer race 95a of a ball thrust bearing 95. In threaded engagement with the interior of the hub portion 93 at the opposite end from the shoulder 94 is another outer race 97a of a second ball thrust bearing 97. A lock nut 98 is provided for maintaining the ball race 97a in the desired position after it has been adjusted.

As will appear from an inspection of Figure 3, the balls 99 of the ball races 95 and 97 engage suitable grooves 80 and 81 formed on opposite sides of a flange 96 integral with the "eccentric member". Due to the fact that the thrust resulting from the explosion in the cylinders and the thrust occasioned by the movement of the pistons during their exhaust stroke exerting pressure on the drive ring from left to right, Figure 3, it will be apparent that the ball thrust bearing 95 is the controlling bearing so far as transmission of motion from the drive ring 10 to the driven shaft 6 is concerned. The primary function of the ball thrust bearing 97 is to securely hold the drive ring in operative engagement with the eccentric member.

This eccentric member is provided with a hub 101 formed with a tapered opening which is securely keyed to a conical enlargement 102 on the shaft 6, the taper of the enlargement accurately corresponding with the tapered opening in the hub 101. Referring to Figure 3, the shortest distance from the center of the shaft to the center of the groove 80 is indicated by the line o—x and the longest distance from the center of the shaft to the center of the groove 80 is indicated by the line o—y. It will be seen that this line x—o—y is inclined to the axis of the shaft. This inclination being at an angle of approximately 66° with the axis of the shaft, i. e., this axis x—o—y is turned 24° in a clockwise direction from a position perpendicular to the shaft, as clearly illustrated in Figure 3. The line x—o—y also indicates the diameter of the eccentric 10. The plane of the periphery of the ball groove is circular and is not in a plane perpendicular to the plane of the drawing, but in the position shown tilted about the line x—o—y so that the eccentric groove on the near or upper side is moved toward the left and the eccentric groove on the far or lower side is moved toward the right as is clearly shown in Figures 3, 4 and 4a. To summarize: as viewed in Figure 3, the line o—y on the plane of the groove of this eccentric is inclined at one angle to the axis of the shaft; the axis of the shaft is oblique to the plane and the fact that the plane of the groove is also tilted as viewed about the line x—o—y.

Figure 4 is an elevation of the eccentric, this figure representing this eccentric as it appears when completely shown in elevation in the position which it occupies in Figure 3. In this Figure 4 only four balls of the thrust ball bearing are shown which correspond to the number of pistons in the cylinder visible from one side of the engine. The number of balls shown is limited for the sake of clearness in explanation but it will be understood that the ball grooves are completely filled with balls.

Figure 4a is a sectional view of this eccentric, same as shown in Figure 3, but with certain balls dotted on the far side or lower side to show the contour of the groove on the lower side for the purpose of more clearly explaining the operation of this drive.

It will be understood that the sequence of the explosion of the cylinders is clockwise when viewed from the right end of Figure 3. It will also be understood that these explosions are so timed that they will take place substantially when the pistons are at the left or outer end of the stroke as illustrated by the position of the lower piston in Figure 3.

The thrust imparted to the drive ring by the several piston rods, during the explosion stroke, transmits the thrust to one or more balls as indicated by $t$, $t'$ and $t^2$, Figure 4a; these thrusts will cause the far side of the eccentric to move in a downward direction and thus will cause the near side of this eccentric 10 to move in an upward direction, as clearly shown by the arrows in Figures 3, 4 and 4a.

The occurrence of the explosion as indicated above will cause the greatest thrust to be transmitted to the balls 99 when in the position indicated by the ball 99' at the arrow $t$, Figures 4 and 4a. This thrust will continue to be exerted as the exploded gases expand and as the shaft rotates. The arrows $t$, $t'$ and $t^2$ may thus be considered to correspond to the forces exerted by three of the pistons, moving under the influence of the exploding charge, all of these forces accumulating to rotate the "compound angle eccentric" in the direction shown. It will be understood that, as this eccentric rotates, it will force the balls 99 and hence the drive ring on the near side in a left-hand direction as clearly shown by the arrows $t^4$ and $t^5$, Figure 4, thus causing the corresponding pistons to move outwardly toward the heads of the cylinders.

Due to the tilt of the eccentric, it will be apparent that the plane of the ball groove 80 is presented to all of the balls 99 and particularly to the ball 99′ at arrow t, at an oblique angle, acute on the side toward the direction of rotation. This ball 99′ will therefore effectively cause the eccentric 10 to move laterally at this point and cause the shaft to rotate in the direction indicated. It will therefore be evident that by mounting this eccentric 10 obliquely upon the shaft I have increased the value of the thrust by the piston which acts as a camming action.

The action of the balls themselves in transmitting the thrust from the drive ring to the eccentric is a rolling action and I have thus provided a very efficient method of transmitting the thrust from the pistons to the driven shaft.

It will be evident by reference to Figure 3 that there will be an oscillation of the drive ring about a vertical axis passing through the point o as the pins 84 move toward and from the cylinders. Simultaneously with the above oscillation there will also be an oscillation of the drive ring about the point o.

In order to permit the actuation of the oscillating drive ring 11 by the rectilineal movements of the piston rods 71, universal connections previously described are provided between the piston rods 71 and the pins 84 of the drive ring, which permit the pins 84 to move laterally as well as radially on an arc to accommodate the oscillation of the drive ring 10 about the point o.

In the above drive, the angle of the piston, the amount of the eccentricity and the angle of the eccentric are so selected with relation to the angle of the shaft that the pin connections 84 begin and end their travel on an extension of the axis of the piston as shown in Figure 3, the pin 84 moving to the position 84a shown in broken lines in Figure 3, when the piston reaches the bottom of its stroke. The path of travel of these pins 84, intermediate of its ends, is a very flat curve substantially coinciding with the axis of the piston.

It will be evident that the thrust which rotates the eccentric 10 in the direction shown, namely, clockwise when viewed from the right of Figure 3, will cause a corresponding reaction in the drive ring 11 in the opposite direction or counter-clockwise. In order to resist this tendency to cause counter-clockwise rotation in the drive ring 11 I have provided a reaction rotation resisting mechanism, best shown in Figures 7, 21 and 22.

This mechanism consists of a boss 79 integrally formed with the ring and between adjacent ears 85 of the drive ring; preferably at the lowermost point of the drive ring. Securely mounted in the boss 79 is a pin 82 upon which is pivotally mounted a square or a rectangular hardened steel block 83.

This block 83 is securely held on the pin 82 by means of a washer and nut 82a. The block 83 is encompassed in a slide frame 135 which is provided with a slot 136 machined for an easy sliding fit on the block 83. This slide frame is provided with a trunnion 137 at each end. These trunnions are mounted in suitable bearings in the main casing 1 which are provided with adjustments to take up wear, as will be closely evident from the drawings.

The length of the slot 136 is sufficient to accommodate the longitudinal movement of the drive ring 11 in transmitting motion from the pistons to the eccentric. The length of the block 83 vertically is sufficient to permit the vertical travel of the drive ring occasioned by the eccentricity of the eccentric and by its arcuate travel due to its oscillation about the point o. The oscillatory mounting provided for this slide frame 135 is intended to accommodate the lateral oscillation of the drive ring also due to the eccentricity of the eccentric 10.

It will be apparent that the eccentric 10 and drive ring 11 due to the eccentricity will produce a slightly unbalanced centrifugal force under rotation. In order to compensate for this centrifugal force of the eccentric I provide a counterweight 138 which is shown attached to a sprocket 103 in any suitable manner said sprocket being provided for a purpose to be hereinafter described. I do not limit myself, however, to this particular method of counterbalancing as the method of counterbalancing is not material.

It will be apparent that I have provided a novel method of transmitting the power from the pistons to the shaft by means of an eccentric making an oblique angle with the driven shaft. It will also be evident that the drive is so arranged that the piston exerts its greatest stress on the shaft when the eccentric presents the greatest leverage to the piston. It will also be clear that, due to the oblique angle which the eccentric makes with the shaft the groove in the eccentric presents an inclined surface to the direction of the thrust applied to the balls.

It will also be apparent that the above-described drive for the driven shaft of this internal combustion engine produces a driving connection between the pistons and the driving ring in which all parts of this connection move substantially in a straight line. It is further evident that side thrust on the pistons and piston rods is thus practically eliminated.

It is to be further noted that upon longitudinal reciprocation of the pistons within the cylinders, that the eccentric movement of driving ring causes a rotational movement to be imparted to the piston adding to the desirable turbulence in the combustion chamber. This also has a further tendency to keep the bore of the cylinder round, preventing alignment of the piston ring gaps and materially aiding lubrication.

Lubricating system

Figures 1, 2, 3, 9 and 10 illustrate the different features of the lubricating system of which the oil pump 17 is the central oil distributing device. This oil pump is driven in the usual manner by means of a chain actuated by the sprocket 103 mounted on the driven shaft 6. This chain passes through a chamber formed in the bracket 16. The pump may be of any desired type having an inlet 104 and a discharge 105. The inlet 104 obtains its supply from a sump 106 formed on the bottom of main casing 1, whence the oil passes to the pump inlet 104 via the suction pipe 107. The discharge opening 105 of the pump connects with a main discharge pipe 108 which supplies two branch pipes 109 and 110. The branch pipe 109 leads directly into the main casing 1 where it is provided with a nozzle 111 adapted to form a very fine spray or mist in the interior of the main casing. This spray or mist thoroughly lubricates all of the exposed moving parts in the interior of the main casing such as piston rods, universal connections of piston rods to drive ring, thrust ball-bearings, etc. The ball-races 95 and 97 are lubricated by means of a series of passages 112 formed in the hub portion 93 of the drive ring 11, as clearly shown in Figure 3. The block 83 and slide frame 135 are amply lubricated by the oil which condenses from the spray and settles in the bottom of the main casing 1.

The other branch pipe 110 is connected with two branches 113 and 114 but continues to the forward end of the engine where it enters the hub 116 adjacent to the bearing 9 at the forward end of the tapered tubular member 5. The bearing 9 is thus efficiently and thoroughly lubricated. This lubricating oil passes from this point to the double roller bearing 8 by way of the interior of the tubular member 5, as will be readily understood. This lubricating oil eventually finds its way into the interior of the main casing 1 through a duct 117 formed in the wall of the cylinder plate 2 as shown in Figure 8.

The branch 114 delivers lubricating oil to the interior of the bracket 16 and thoroughly lubricates the drive chain housed therein. This lubricating oil likewise finds its way to the interior of the main casing 1. A small connecting pipe 119 Fig. 10 is provided to carry the oil from the lowermost portion of the pump drive to the interior of the main casing.

The branch 113 feeds lubricating oil to the roller bearing 7, as clearly shown in Figures 1 and 9, through a rib formed in the casing. The bearing 7 is thus completely and efficiently lubricated. The oil from this bearing is likewise returned to the interior of the main casing 1 through the duct 118, Figure 9.

Branching from the line 113 are lines 115 and 115' which lubricate the pistons 12 and piston rods 71 and which are clearly shown in Figures 1 and 10. Line 115 feeds lubricant to the pistons and piston rods on the near side of the engine as illustrated in Figure 1, and line 115' feeds lubricant to the pistons and piston rods on the far side of this engine. Inasmuch as the lines on the far side of the engine are identical with the lines on the near side, the lines on the far side of the engine are not shown and it will only be necessary to describe the set of lines on the near side of the engine.

Line 115 separates into two branches 139 and 140, each of which is provided with a valve for throttling the oil in order to control the amount of lubricant passing through these two branches.

Branch 139 supplies lubricant to the pistons on the near side and for this purpose is provided with three sub-branches 141 which enter the cylinder through an opening 142, as clearly shown in Figures 12, 14 and 20. The location of this opening 142 with relation to the piston travel is such that this opening is never completely uncovered by the piston, as will be clearly seen from an inspection of Figures 11 and 12. The opening 142 is preferably placed near the top of the cylinder in order that the lubricant may more easily lubricate the piston by gravity.

Branch 140 supplies lubricant to the piston rods and for this purpose is provided with three sub-branches 143 which are connected into an opening in the spacer 4 which, in turn, is provided with a duct 144 leading to the piston rods 71, as is clearly shown in Figures 1, 3 and 11.

Modified form of piston rod mounting

For certain conditions of operation of this engine I have found it desirable to provide a modified form of mounting for the piston rod and I am illustrating this modified form of mounting in Figures 23 and 24. The essential difference between this type of mounting and the type of mounting illustrated in Figure 3 is that this modified mounting comprises the use of a longer bearing and improved lubricating grooves in the piston rod to insure the proper lubrication of this longer bearing. Referring to Figure 23 a longer spacer 145 has been substituted for the spacer 4 permitting the use of a longer bearing 146 for the piston rod 151. This piston rod 151 is formed with two grooves 147 and 148. Adjacent to and on both sides of each of these grooves is a split ring 149. The distance between the grooves 147 and 148 is exactly equal to the stroke of the piston and these grooves are so located that the grooves register with an opening 150 which supplies lubricant to this bearing from line 143.

It will be apparent that the groove 147 will become filled or partially filled with lubricant when it registers with the opening 150 and that when the piston rod moves toward the right, Figure 23, this groove 147 will distribute the lubricant along the bearing 146 until the groove reaches the position 147' shown in broken lines in Figure 23. At the instant when groove 147 reaches the point 147', groove 148 will register with opening 150. This groove 148 will then become filled with the desired amount of lubricant and in its travel to the left, Figure 23, will distribute this lubricant over the bearing 146. In this manner the entire bearing 146 will be thoroughly and efficiently lubricated which lubrication is assisted and uniformly distributed by the piston rings 149 on each side of each of the grooves.

The construction of piston rod bearing shown in Figure 23 not only provides a very satisfactory bearing and means of lubricating the same, but also prevents the loss of any combustible mixture between the piston rod 151 and its bearing 146 when extremely high pressures are developed in the primary compression chamber 40.

It will thus be seen that all moving parts of this improved engine are thoroughly, efficiently and directly lubricated.

Thrust bearings and thrust adjustment

Referring to Figures 3, 8 and 21, a ball-thrust-bearing 120 is provided to resist any possible thrust of the shaft in a forward direction. It will be understood that practically no operating thrust will take place in this direction and that the main purpose of this bearing is to locate the shaft. In order to properly locate the shaft 6, a threaded collar 121 and lock nut 122 therefor are provided for engagement with the ball-thrust-bearing 120 to prevent the forward movement of the shaft.

A nut 123 is provided for forcing the tapered hub portion of the eccentric 10 on the tapered portion of the shaft 6, and holding it in place longitudinally.

A ball-thrust-bearing 124 is provided to oppose the thrust exerted by the explosive forces exerted by the pistons on the shaft through the drive ring 11 and eccentric 10. It is very essential that this thrust bearing 124 be capable of adjustment longitudinally both for original assembling and to compensate for wear. It will be understood that any movement of the shaft longitudinally will automatically affect the degree of opening of the various inlet and exhaust ports in the cylinders.

This thrust of the bearing 124 against the casing 1 is resisted by means of an adjustable hub member 125 having threaded engagement with the interior of a sleeve 126 secured to the main casing 1 as illustrated in Figs. 3 and 9. A lock nut 127 is provided for holding the hub 125 in place after it has been adjusted to the desired position. An additional threaded ring 128 is provided for engagement in the threaded interior portion of the sleeve 126. This ring 128 is formed interiorly with threads for engagement with a ring 129 which is adapted to hold the outer race of the roller bearing 7 in position, an additional lock nut 130 having threaded engagement with the shaft for holding the inner race of the roller bearing 7 in position.

It will thus be evident that I have provided a means of adjusting the location of the shaft and compensating for wear which is simple in its construction.

In practice it will be understood that the adjustment for the proper location of the ball-thrust-bearing 124 is made first and thereafter the thrust bearing 120 is properly adjusted to eliminate backlash or loose play.

Cylinder cooling

Referring to Figures 1, 2, 3 and 11 to 19, the side walls of the cylinders are each provided with annular radiating flanges 131 uniformly and substantially equally spaced. The outside diameter of the flanges is greater near the head of the cylinder than the diameter of the flanges near to the base of the cylinder due to the fact that the greatest amount of heat is generated within the cylinder near the upper portion of the cylinder and the radiating requirements through the cylinder walls are therefore greater. The cylinder heads 76 are likewise provided with radiating flanges 132 and 132'. The flanges 132 extend to the extreme periphery of the cylinder head casting. The flanges 132' are cut short to permit the insertion of the cap screws or bolts 133.

Reference to Figures 1, 2 and 3 will disclose the fact that the cylinders are in closer proximity to the shaft at the inner or rear ends than they are at the outer ends and that these cylinders are substantially equally spaced around the shaft. The axes of the cylinders are in fact located in the surface of a cone, the apex of which intersects the axis of the shaft. It will also be apparent that this cone or funnel shaped arrangement of the cylinders has its opening adjacent to the cooling fan 15. It will further be evident that the cylinders are all equidistant from the fan and that the cylinder heads 76 are placed as close to the fan as possible, and that the heads are closer to the fan than any other portion of the cylinder.

It will be apparent from the above that the air current generated by the fan will be forced into the funnel shaped opening formed by the cylinders and that the cooling air will pass laterally and radially outward along and about the flanges 131. It will also be apparent that the fan will supply the greatest volume of cooling air and the coolest air to the heads of the cylinders which have the greatest requirement for the cooling air. It will also be apparent that the arrangement of flanges 132 and 132' provides the maximum possible area of cooling flanges for the head.

*General*

In the engine illustrated and described above, six cylinders are provided. It will be understood that the number of cylinders used may be varied.

Practically all of the novel features illustrated and described herein can be incorporated in an internal combustion engine of the water-cooled type without substantial modification and without departing from the spirit of this invention.

An engine of this type is quiet in operation due to the many mechanical improvements disclosed, prominent among which are the steady, unidirectional force transmitted by the pistons to the driven shaft, the elimination of valves and all unnecessary moving parts tending to cause noise or vibration. An engine built in accordance with this invention is especially economical in construction due to the compact arrangement of and simplicity of its parts and due to the small space occupied per horse power developed.

Although I have described my invention and have explained its method of operation I do not desire to limit my invention should it later be discovered that other theories enter into the operation.

Having thus described the invention in an embodiment thereof I am aware that numerous and extensive departures may be made therefrom but without departing from the spirit thereof.

I claim:

1. In an engine, a housing, a driven shaft rotatably carried by the housing, driven means supported by said shaft, cylinders supported by said housing, pistons and rods reciprocable in said cylinders, means connecting said rods to said driven means, said driven means including a circular member disposed eccentrically upon the shaft.

2. In an engine, a housing, a driven shaft rotatably carried by the housing, driven means supported by said shaft, cylinders supported by said housing pistons and rods reciprocable in said cylinders means connecting said rods to said driven means, said driven means including a circular member disposed eccentrically and obliquely upon said shaft.

3. In an engine, a housing, a driven shaft rotatably carried by the housing, driven means supported by said shaft, cylinders supported by said housing, pistons and rods reciprocable in said cylinders means connecting said rods to said driven means, said driven means including a circular member obliquely and eccentrically disposed upon said driven shaft and an annular member relatively rotatably connected to said driving means.

4. In an engine, a housing, a driven shaft rotatably carried thereby, a circular member obliquely and eccentrically carried by said shaft, cylinders supported by the housing with their axes in a conical plane, pistons and rods reciprocable in the cylinders, an annular member relatively rotatably carried upon said circular member and means connecting said rods to said last mentioned member.

5. In an engine, a housing, a driven shaft rotatably carried thereby, a circular member obliquely and eccentrically carried by said shaft, cylinders supported by the housing with their axes in a conical plane, pistons and rods reciprocable in the cylinders, an annular member relatively rotatably carried upon said circular member and means connecting said rods to said last mentioned member, said rods rigidly carried by said pistons.

6. In an internal combustion engine, a housing, a driven shaft, a manifold member carried by said housing, cylinders and rod guides carried by said member, pistons reciprocable in said cylinders and rods rigidly carried by the pistons reciprocable through said guides, eccentric drive means supported by the driven shaft and means operatively connecting said drive means to said piston rods.

7. In an engine, the combination of a housing, a driven shaft rotatably supported thereby, a manifold member supported at an end of the housing, cylinders and piston rod guides carried by the manifold member pistons and rods reciprocable in said cylinders and guides means to transmit movement from the piston rods to the shaft including a circular member eccentrically and obliquely supported by the shaft and an annular member concentrically supported on the circular member, a universal joint connecting said rods to said annular member.

8. In an internal combustion engine, a housing, a manifold member carried thereby, a shaft rotatably supported by the housing, piston rod guides and cylinders supported by the manifold member, said piston rod guides closing the base of the cylinders, pistons reciprocable in said cylinders, piston rods rigidly carried by the pistons and reciprocable in said piston rod guides, a cam rigidly carried by the shaft with its periphery disposed eccentrically and obliquely upon the shaft, the edges of said cam forming ball races, a cam operating annulus disposed about said cam the inner face of said annulus supporting outer races and ball bearings disposed between said inner and outer races, a universal joint connecting said rod to the periphery of said annulus, the walls of said cylinder defining fluid passages to conduct a gas from said manifold to a primary chamber and from said primary chamber to said combustion chamber, a valve carried by one of said passages to admit air to said primary chamber.

9. In an internal combustion engine, a housing, a manifold supported thereby, cylinders and piston rod guide supported by said manifold, a driven shaft supported by the housing and manifold, driven means carried by said shaft including a cam eccentrically and obliquely disposed on said shaft and means operatively connecting said cam to said rods including an annular member relatively rotatably supported upon said cam and means to restrain rotation movement of said member.

10. In an internal combustion engine, a housing, a manifold supported thereby, cylinders and piston rod guide supported by said manifold, a driven shaft supported by the housing and manifold, driven means carried by said shaft including a cam eccentrically and obliquely disposed on said shaft and means operatively connecting said cam to said rods including an annular member relatively rotatably supported upon said cam and means to restrain rotation movement of said member including a guideway supported by said housing and a torque arm supported by the annulus.

11. In an internal combustion engine, a housing, a manifold supported thereby, cylinders and piston rod guide supported by said manifold, a driven shaft supported by the housing and manifold, driven means carried by said shaft including a cam eccentrically and obliquely disposed on said shaft and means operatively connecting said cam to said rods including an annular member relatively rotatably supported upon said cam and means to restrain rotation movement of said member including a guideway supported by said housing and a torque arm supported by the annulus said torque arm operating within the confines of said guideway.

12. In an internal combustion engine, including a housing, a shaft rotatably disposed in the housing, a wobble plate carried by the shaft, pistons and connecting rods operatively connected to said wobble plate, said wobble plate being eccentrically and obliquely mounted on the shaft, the plane of the wobble plate defined by its periphery being oblique to a plane defined by the axis of the shaft and the axis of the connecting rods.

13. In an internal combustion engine, the combination of a housing, cylinders carried by the housing, a shaft rotatably carried by the housing, pistons reciprocably disposed in the cylinders, connecting rods rigidly carried by the pistons, a wobble plate eccentrically mounted on the shaft, a rotary member operatively associated with the wobble plate and means to connect said member to the connecting rods, the plane defined by the periphery of the wobble plate being so inclined relative to the axis of the shaft that when combustion within a cylinder occurs the connecting rod acts upon the wobble plate at its greatest point of eccentricity at which time the plane defined by the periphery of the wobble plate is oblique to a plane defined by the axis of the shaft and the line forming the axis along which the piston reciprocates.

14. An internal combustion engine comprising a housing, cylinders carried by the housing, with the axes of the cylinders lying in the plane of a cone, pistons reciprocably disposed in the cylinders, connecting rods rigidly connected to the pistons, a shaft rotatably disposed within the housing intersecting the axis of the plane formed by the cylinder, a wobble plate carried by the shaft, an annular drive ring relatively rotatably disposed upon the wobble plate, links connecting the rods to said annulus, said wobble plate being eccentrically disposed on the shaft with the plane bounded by its periphery inclined relative to the axis of the shaft, so that at the start of the power stroke of the piston the power is applied by the piston through the connecting rod to the wobble plate at its greatest point of eccentricity to cause the wobble plate to move.

In testimony whereof I hereunto affix my signature this 30th day of April, 1929.

CHARLES E. SCHLENKER.